United States Patent [19]
Hasegawa

[11] Patent Number: 6,075,222
[45] Date of Patent: Jun. 13, 2000

[54] METHOD FOR MANUFACTURING A LIQUID JET RECORDING HEAD

[75] Inventor: Toshinori Hasegawa, Yokohama, Japan

[73] Assignee: Canon Kabushiki Kaisha, Tokyo, Japan

[21] Appl. No.: 08/969,286

[22] Filed: Nov. 13, 1997

[30] Foreign Application Priority Data

Nov. 13, 1996 [JP] Japan ..................................... 8-317174
Nov. 10, 1997 [JP] Japan ..................................... 9-323731

[51] Int. Cl.$^7$ .................................................. B23K 26/00
[52] U.S. Cl. ...................................... 219/121.71; 264/400
[58] Field of Search ........................... 219/121.69, 121.7, 219/121.71, 121.73, 121.85; 29/890.1; 264/400; 347/44, 47

[56] References Cited

U.S. PATENT DOCUMENTS

| | | | |
|---|---|---|---|
| 5,189,437 | 2/1993 | Michaelis et al. ................ | 219/127.7 X |
| 5,208,604 | 5/1993 | Watanabe et al. .......................... | 347/47 |
| 5,237,148 | 8/1993 | Aoki et al. ............................ | 219/121.7 |
| 5,270,771 | 12/1993 | Sato ........................................... | 355/53 |
| 5,389,954 | 2/1995 | Inaba et al. .............................. | 347/258 |

FOREIGN PATENT DOCUMENTS

| | | |
|---|---|---|
| 0500110 | 8/1992 | European Pat. Off. . |
| 2-155579 | 6/1990 | Japan . |
| 5-111782 | 5/1993 | Japan . |
| 6-297176 | 10/1994 | Japan . |
| 9-216084 | 8/1997 | Japan . |

*Primary Examiner*—Geoffrey S. Evans
*Attorney, Agent, or Firm*—Fitzpatrick, Cella, Harper & Scinto

[57] ABSTRACT

A method for manufacturing a liquid jet recording head comprises the steps of forming liquid flow paths on a roughly molded resin product by grooving by the irradiation of laser beams and/or forming discharge openings by drilling also by the irradiation of laser beams, and of moving in the direction of the optical axis of the laser beams a mask having opening patterns for grooving and/or drilling arranged for the optical path of the laser beams during processing by the irradiation thereof, hence preventing processing pitches from being deviated due to the thermal expansion or contraction of resin that may take place when grooves or holes are processed. In this way, it is made possible to form them on a resin ceiling plate in good precision with good production yield, and also, to contribute to reducing the costs of manufacture significantly.

4 Claims, 6 Drawing Sheets

FIG. IA
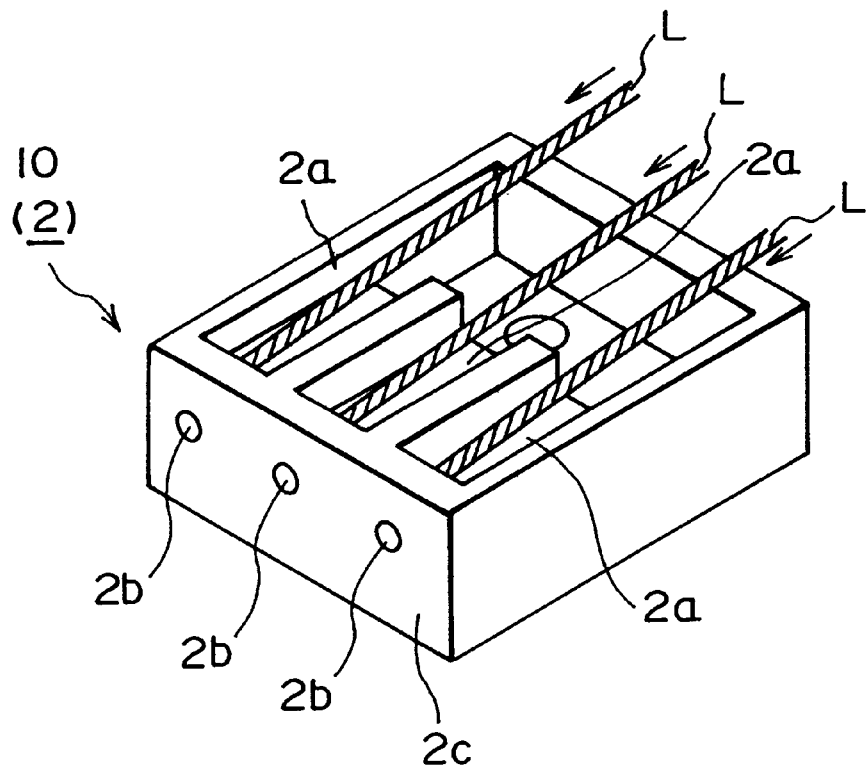
FIG. IB
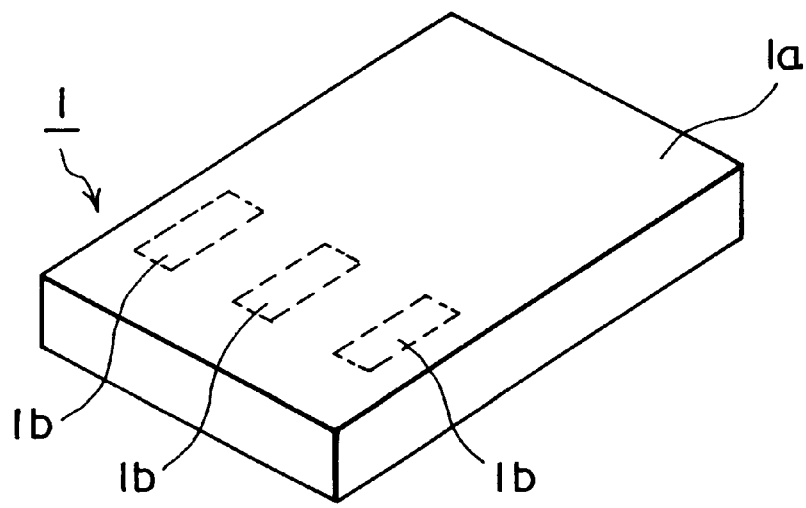

METHOD FOR MANUFACTURING A LIQUID JET RECORDING HEAD

BACKGROUND OF THE INVENTION

1. Field of the Invention

The present invention relates to a method for manufacturing a liquid jet recording head whereby to produce a resin ceiling plate by means of grooving, drilling, or the like using laser beams. The invention also relates to a liquid jet recording head.

2. Related Background Art

The liquid jet recording head, which is used for recording or printing on a recording medium (a recording paper sheet or the like) by discharging recording liquid (ink) from fine discharge openings (orifices) as flying droplets, is provided with a substrate (heater board) having a plurality of electrothermal transducing devices and lead electrodes therefor. It has been practiced, in general, that a resin nozzle layer (liquid flow path formation layer) that forms liquid flow paths (nozzles) and a common liquid chamber is laminated on the substrate, and then, a glass ceiling plate, which is provided with recording liquid supply tubes, is overlaid on such layer. In recent years, however, the glass ceiling plate is omitted. Here, a resin ceiling plate is formed instead by an injection molding or the like together with the recording liquid supply tubes in addition to the liquid flow paths and the common liquid chamber. Then, after discharge openings are processed, the ceiling plate is pressed to the substrate by means of an elastic member. In this way, an integrated liquid jet recording head has been developed. Such liquid jet recording head makes it possible to reduce the number of parts to be assembled, simplifying the assembling steps significantly, thus contributing to reducing the cost of manufacture remarkably.

FIG. 3 is a partly broken perspective view which shows the resin ceiling plate, illustrating the fundamental mode of a liquid jet recording head Eo using the resin ceiling plate. The liquid jet recording head Eo comprises a substrate 1001 provided with a plurality of electrothermal transducing devices 1001a, and a resin ceiling plate 1002 provided with liquid flow paths 1002a positioned on each of the electrothermal transducing devices 1001a, and a common liquid chamber 1002b conductively connected with them. For the resin ceiling plate 1002, there are formed integrally a discharge opening plate 1002d having discharge openings 1002c which are conductively connected with each of the liquid flow paths 1002a, and a cylindrical extrusion 1002f having a liquid supply opening 1002e which is open to the common liquid chamber 1002b.

The resin ceiling plate 1002, which is provided with the discharge opening plate 1002d and the cylindrical extrusion 1002f in addition to the liquid flow paths 1002a and the common liquid chamber 1002b, is integrally formed by means of an injection molding or the like. Then, after discharge openings 1002c are processed to be formed, the ceiling plate 1002 is pressed onto the substrate 1001 by means of an elastic member (not shown), while the liquid flow paths 1002a are positioned on the electrothermal transducing devices 1001a, respectively. Then, these members are bonded altogether. The substrate 1001 is fixed to the base plate 1004 by means of screws or some other known methods together with the circuit board 1003 having driving circuits arranged on it to generate electric signals transmitted to each of the electrothermal transducing devices 1001a.

Also, a work (roughly molded product), which comprises the main body portion before the provision of liquid flow paths 1002a, the discharge opening plate 1002d before the provision of the discharge openings 1002c, and others, is integrally formed by means of an injection molding. Then, using excimer laser beams the liquid flow paths 1002a are grooved on the main body portion of the resin ceiling plate 1002, and likewise, each of discharge openings 1002c is formed on the discharge opening plate 1002d by drilling using the excimer laser beams as well. In this way, a method for manufacturing the resin ceiling plate 1002 has been developed.

By the combination of the injection molding and the laser processing such as described above, it is possible to produce the resign ceiling plates at lower costs, thus promoting the manufacture of liquid jet recording heads at lower costs. In this respect, the laser processing apparatus, which performs the irradiation of excimer laser beams to form grooves and holes on the work that has been obtained by the injection molding, is generally provided with a mask having the opening patterns for the formation of the liquid flow paths and discharge openings of a liquid jet recording head, and also, with a projection optical system that enables the opening patterns of the mask to be projected on the work using the excimer laser beams.

For the laser processing equipment that uses the mask, a laser drilling apparatus has been applied for patent, such as in Japanese Patent Laid-open Application No. 5-111782, where a mechanism is provided for executing periodical sampling inspections to reset the laser power and its irradiation period or to adjust mask positions in order to obtain highly precise configuration and dimension with respect to the work.

However, when a plurality of liquid flow paths and discharge openings are processed on an injection molded work for the formations thereof altogether by means of laser processing using the conventional technique described above, the energy of the excimer laser beams is concentrated on the work so that the surface temperature of the work may arrive at 100° C. to 200° C. while grooves or holes are being processed. As a result, the resin that forms the work tends to be expanded or contracted due to heat, which causes errors in the projection pitches of grooves or holes, and leads to reducing the yield of the products.

This in turn requires a complicated adjustment of processing pitches of the grooves or holes. It takes a long time to complete such complicated adjustment, presenting a problem that the operational efficiency is seriously affected.

SUMMARY OF THE INVENTION

The present invention is designed with a view to solving such problem still existing in the conventional technique as described above. It is an object of the invention to provide a method for manufacturing liquid jet recording heads whereby to form liquid flow paths and discharge openings on a resin ceiling plate in good precision without causing any deviation in pitches of grooves or holes due to the expansion or contraction of resin generated when grooves or holes are processed on an injection mold resin work using excimer laser beams. It is also the object of the invention to provide a liquid jet recording head.

It is another object of the invention to provide a method for manufacturing liquid jet recording heads comprising the following steps of:

forming liquid flow paths on a roughly molded resin product by grooving by the irradiation of laser beams and/or forming discharge openings by drilling by the irradiation of laser beams; and moving in the direction of the optical axis of the laser beams a mask having opening patterns for grooving and/or drilling arranged for the optical path of the laser beams during processing by the irradiation of the laser beams so as to prevent processing pitches from being deviated due to heat.

Other objectives and advantages besides those discussed above will be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 1A and 1B are views which illustrate a method for manufacturing liquid jet recording heads in accordance with the present invention.

DETAILED DESCRIPTION OF THE PREFERRED EMBODIMENTS

Figure 2:
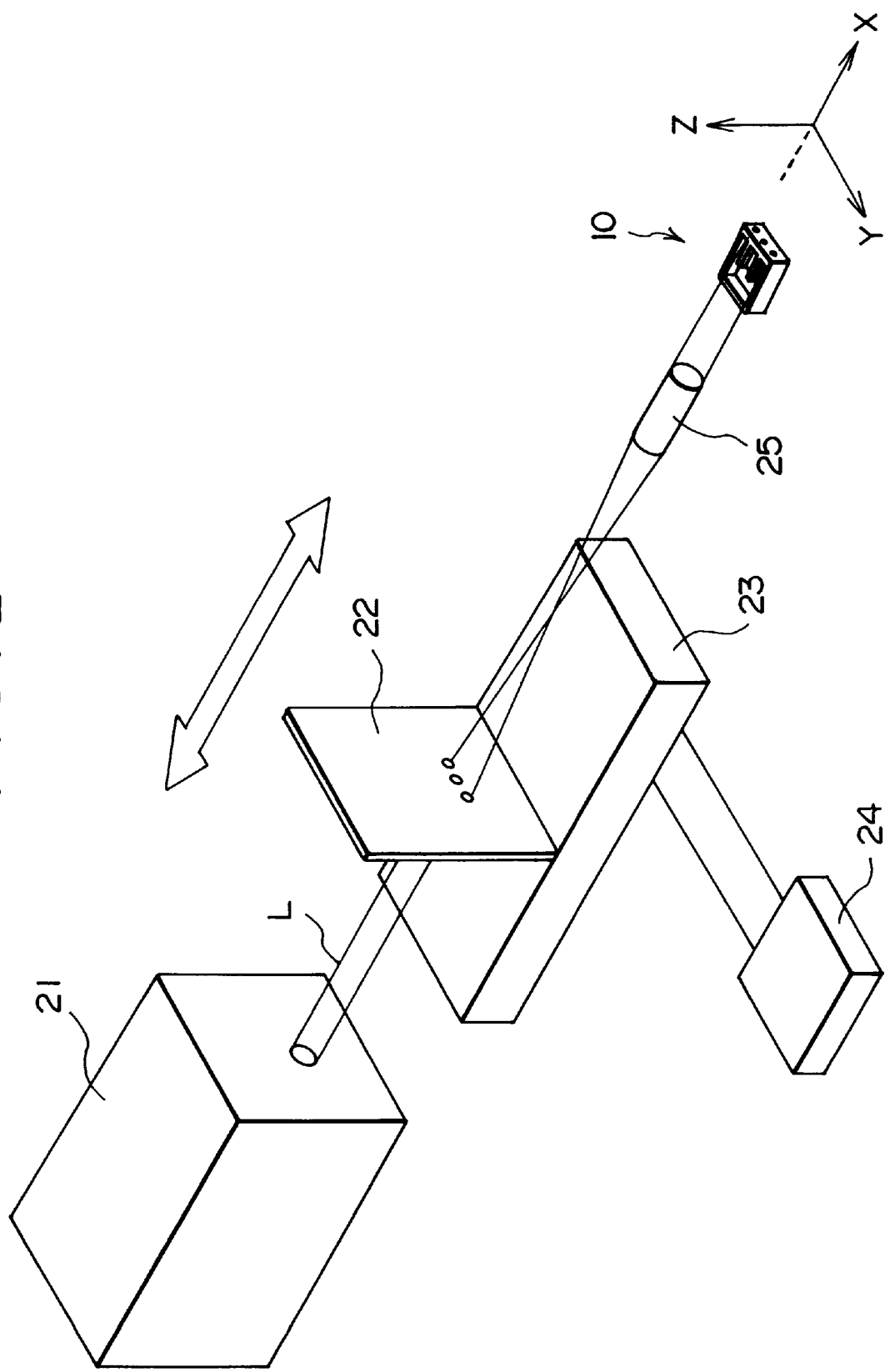
FIG. 2 is a perspective view which schematically shows a laser processing apparatus presenting a mode in which liquid flow paths or discharge openings are processed and formed on a resin ceiling plate of a liquid jet recording head by the irradiation of laser beams onto the plate.
Figure 3:
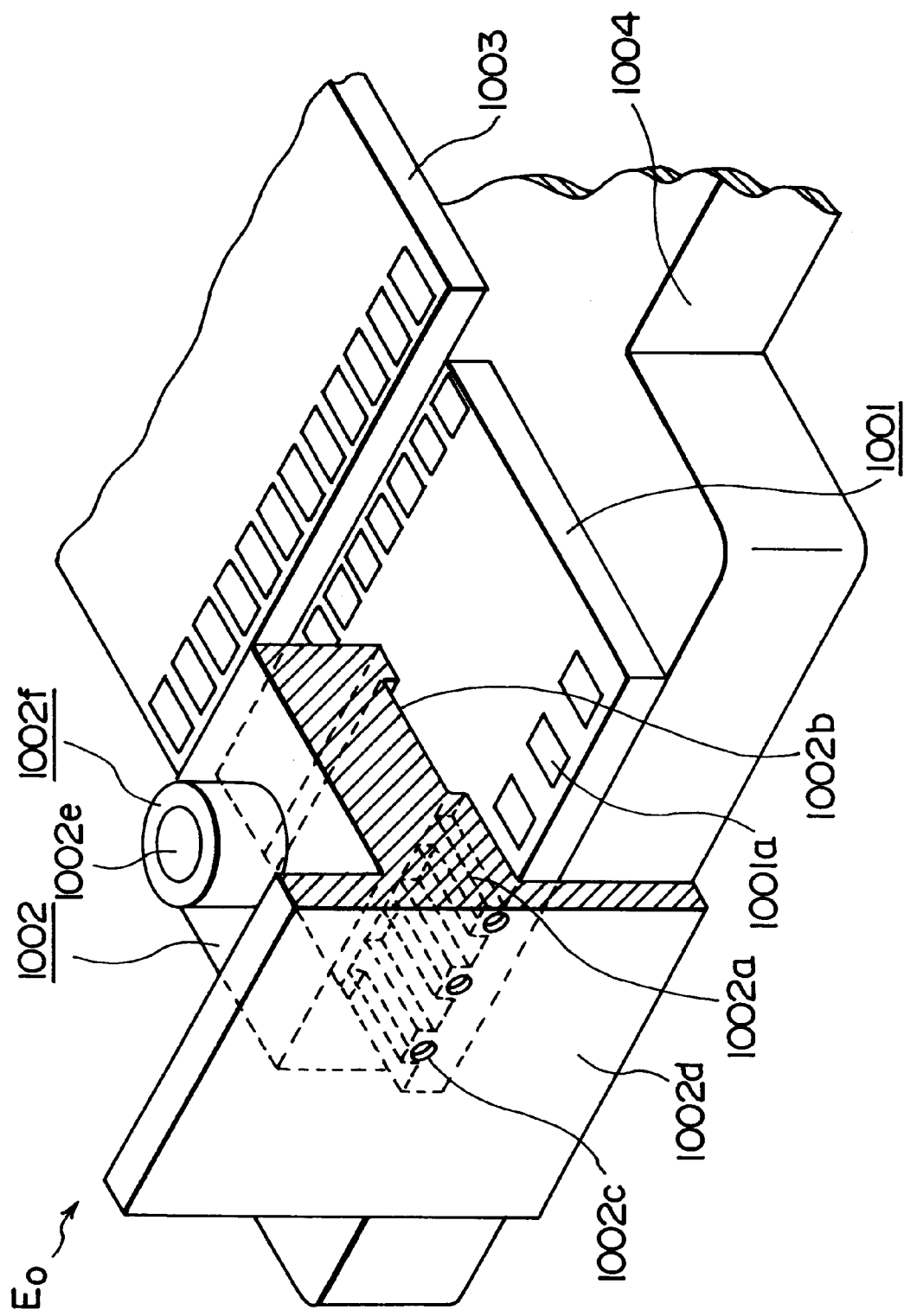
FIG. 3 is a partly broken perspective view which schematically shows the fundamental mode of a liquid jet recording head using a resin ceiling plate.

With reference to the accompanying drawings, the description will be made of the embodiments in accordance with the present invention.

FIGS. 1A and 1B are views illustrating a method for manufacturing liquid jet heads in accordance with the present invention. A work 10, which is a roughly molded resin product having a recessed portion that becomes the common liquid chamber of a liquid jet recording head, is integrally formed by means of known injection molding. Then, using excimer laser liquid flow paths 2a are formed by grooving thereon. Further, using excimer laser discharge openings 2b are formed by drilling. The resin ceiling plate 2 thus obtained, which is a liquid flow path formation layer, is positioned and bonded to the substrate 1 having electro-thermal transducing devices 1b on the surface 1a thereof.

The laser processing apparatus used for such grooving and drilling is, as shown in FIG. 2, provided with a laser light source 21 that emits excimer laser beams L; a mask 22 having opening patterns for use of grooving and/or drilling; a movement driving device 23 that enables the mask to move forward or backward in the direction of optical axis of the excimer laser beams L; a controller 24 that controls the movement driving device 23; and a projection optical system 25 that projects the opening patterns onto the work 10.

The work 10 is positioned by means of a movable stage (not shown) within the plane (Y-Z plane) perpendicular to the optical axis (axis X) of the excimer laser beams L.

As the mask 22, it may be possible to use the one that has opening patterns for grooving to form liquid flow paths, the one that has opening patterns for drilling to form discharge openings, the one that has opening patterns both for grooving to form the liquid flow paths and for drilling to form discharge openings, or the like.

The movement driving device 23 is provided with a driving device using a motor (such as a stepping motor, a servo motor), which is arranged to move the mask 22 arbitrarily by means of the controller 24 in a precision of micron unit in the direction of the optical axis of the excimer laser beams L. Also, it is made possible to select a continuous movement of the mask 22 at a constant speed or an intermittent movement thereof.

The excimer laser beams L transmitted through the mask 22 are irradiated onto the work to be processed as shown in FIG. 1A. At this juncture, the excimer laser beams L hit the discharge opening formation plate 2c through the space in each of the liquid flow paths 2a and heat such portion to form each of the discharge openings 2b. In this process, the excimer laser beams L heat the discharge opening formation plate 2c rapidly to raise its surface temperature to be 100° C. to 200° C. instantly. The heat thus generated is transferred all over the work 10. The work 10 is then expanded once. However, with the termination of laser irradiation, the temperature is lowered to the normal level. Then, the volume once expanded is contracted. As a result, it becomes impossible to obtain the desired dimensional accuracy for pitches of the grooves and holes processed by the irradiation of excimer laser beams L.

Here, with reference to FIGS. 4A and 4B, the specific description will be made. In order to make the schematic representation easily understandable, the stretch resulting from the thermal expansion is enlarged. Actually, however, the amount of stretch on one side is approximately $\Delta l = 2 \mu m$ against the total pitch l=9 mm.

Figure 4A:
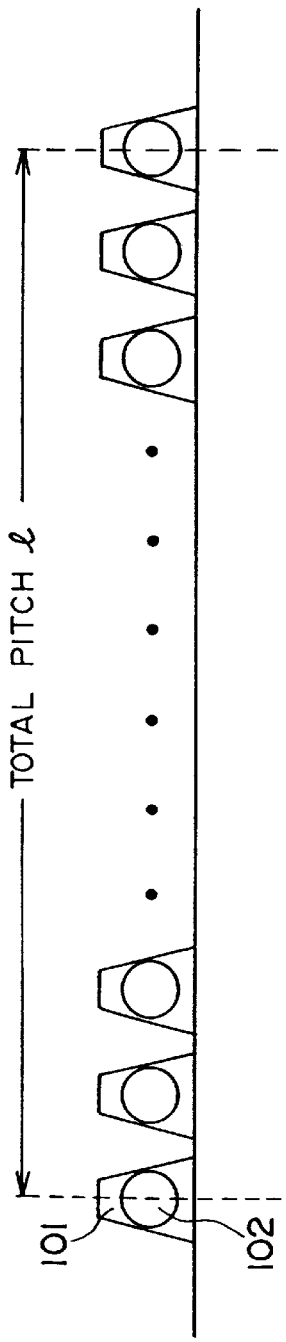
FIGS. 4A and 4B are views which schematically illustrate the state of pitch deviation resulting from thermal expansion when grooves and holes processed.
Figure 4B:
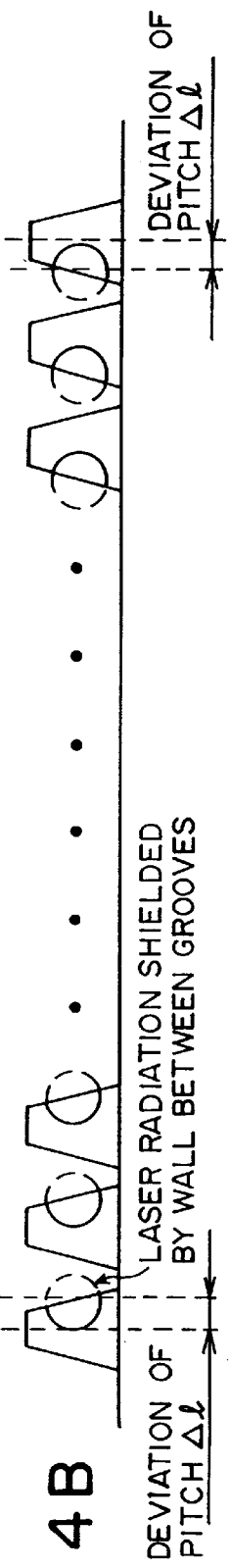

In accordance with FIGS. 4A and 4B representing a work, the length of the work is l before processing, but it becomes $l+2\times\Delta l$ at the maximum due to the thermal expansion brought about by heat given by the laser processing to the work.

Here, as an example, the description will be made of the case where discharge openings are laser processed on the work on which the grooving has been completed. If laser beams 102 are irradiated on the discharge opening formation plate 2c with the mask being fixed as in the conventional art, the entire body of the work is thermally expanded. Consequently, stretching takes places in the arrangement direction of the grooves 101 as shown in FIG. 4A to the one shown in FIG. 4B. Then, there are some cases where the laser beams 102 applied to the formation of discharge openings may partly hit some of the grooves 101. The discharge openings that should be made in the specific positions between grooves 101 may be deviated, and some of them are partly cut to present defective configuration. The formation of such discharge openings, which differs from the formation ideally anticipated, produces adverse effect on the discharge performance eventually.

Further, a formation of the kind may become a fatal defect in consideration of the advancing technologies and techniques with respect to the provision of highly densified or elongated heads in the future.

Here, therefore, it is devised to move the mask in the direction of the optical axis of laser beams to focus on the work so as to change the processing dimensions of holes freely (larger or smaller analogously). As a result, the pitch deviation of grooving or drilling due to the thermal expansion or contraction of the work 10, which take place on a work 10 when excimer laser beams are irradiated thereupon, can be absorbed by moving the mask 22 in the direction of the optical axis of excimer laser beams L. Here, the movement driving device 23 is driven in order to move the mask 22 in the direction of the optical axis of excimer laser beams L in order to eliminate the deviation of processing pitches. Hence, it becomes possible to attempt the enhancement of the processing precision and the stabilization of processing pitches as well.

Now, the detailed description will be made of the method of manufacture in accordance with the present invention. In order to process and form the liquid flow paths and/or discharge openings on a work 10 produced by resin molding, excimer laser beams L are irradiated onto the work 10 set on the movable stage (not shown) through the mask 22 having opening patterns for grooving and/or drilling. Then, during the exposure of the excimer laser beams L to the work 10, the movement driving device 23 is continuously driven so as to move the mask 22 continuously in the direction of the optical axis of the excimer laser beams L.

Figure 5:
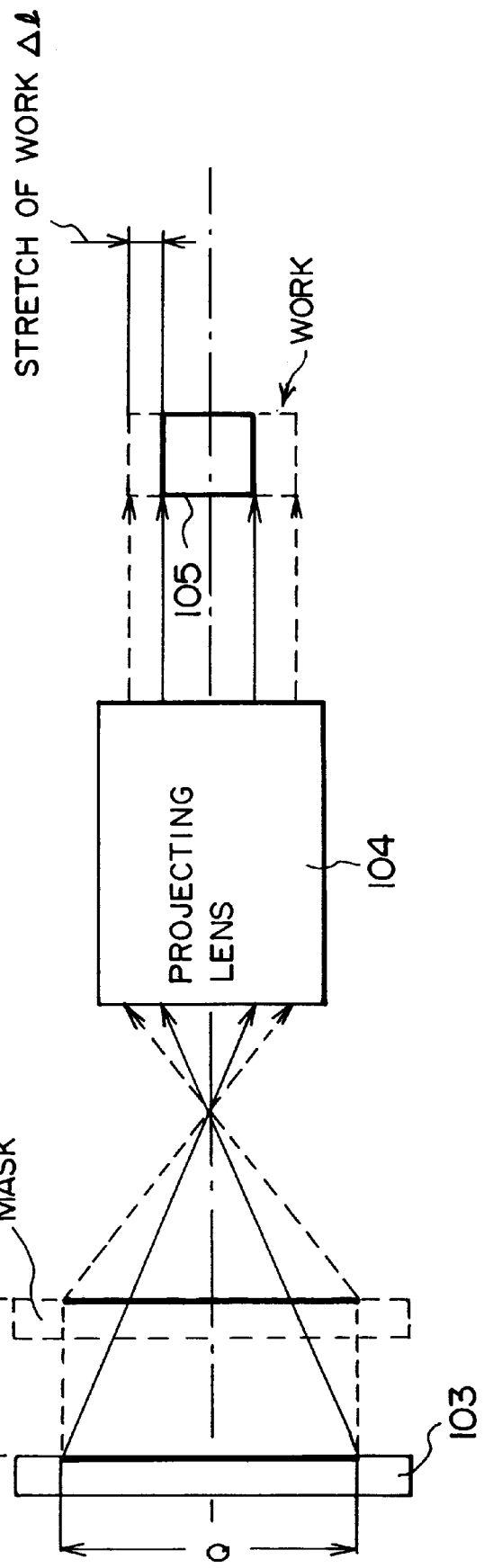
FIG. 5 is a view which schematically shows the correction of drilling pitches by the movement of a mask.

Here, with reference to FIG. 5, the specific description will be made. In order to make the schematic representation easily understandable, the stretch resulting from the thermal expansion is enlarged. Actually, however, the amount of stretch on one side is approximately $\Delta l = 2$ μm against the total pitch l=9 mm.

Given the stretch of the work 105 in the process on one side as $\Delta l$, the total pitch of the hole on the mask 103, as Q, the amount of mask movement P is:

$$P = \alpha \times \frac{2 \times \Delta l}{Q}$$

where α is the proportional constant defined by the optical system provided for the apparatus. 104 denotes a projection lens.

Hereinafter, the description will be made of the specific structure that enables the mask to move.

Figure 6A:
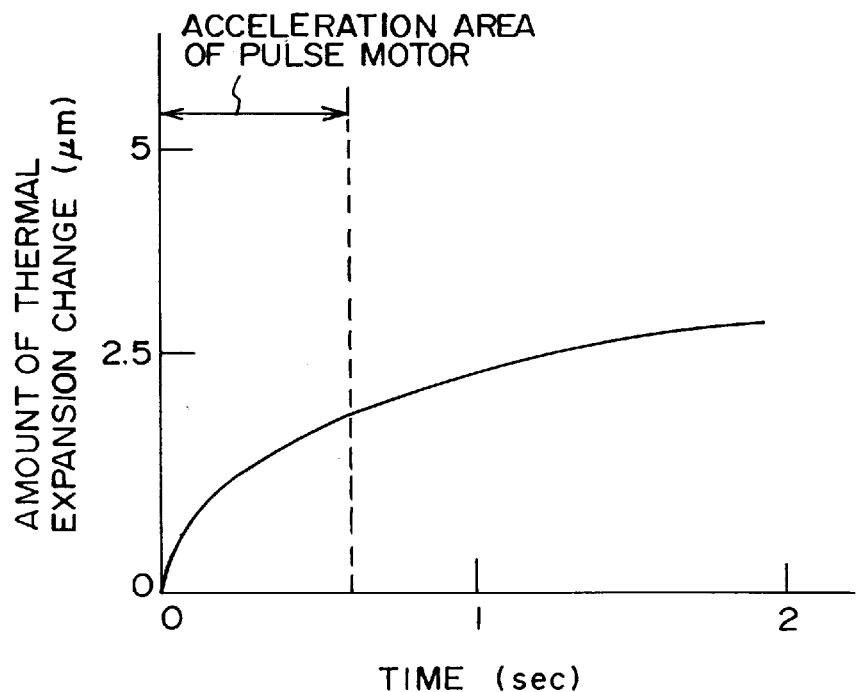
FIGS. 6A and 6B are views which illustrates the changes of thermal expansion of a ceiling plate at the time of being processed, and the related driving of a pulse motor serving as means for moving the mask.

Thermal expansion is given to the work to be processed when the processing begins, and as shown in FIG. 6A, the changes of the thermal expansion take place.

With attention being given to the rising portion of the amount of thermal expansion changes, a driving mechanism that uses a pulse motor is introduced into the mechanism that enables the mask to move in the direction of the optical axis in order to absorb the changing amounts of the thermal expansion.

Figure 6B:
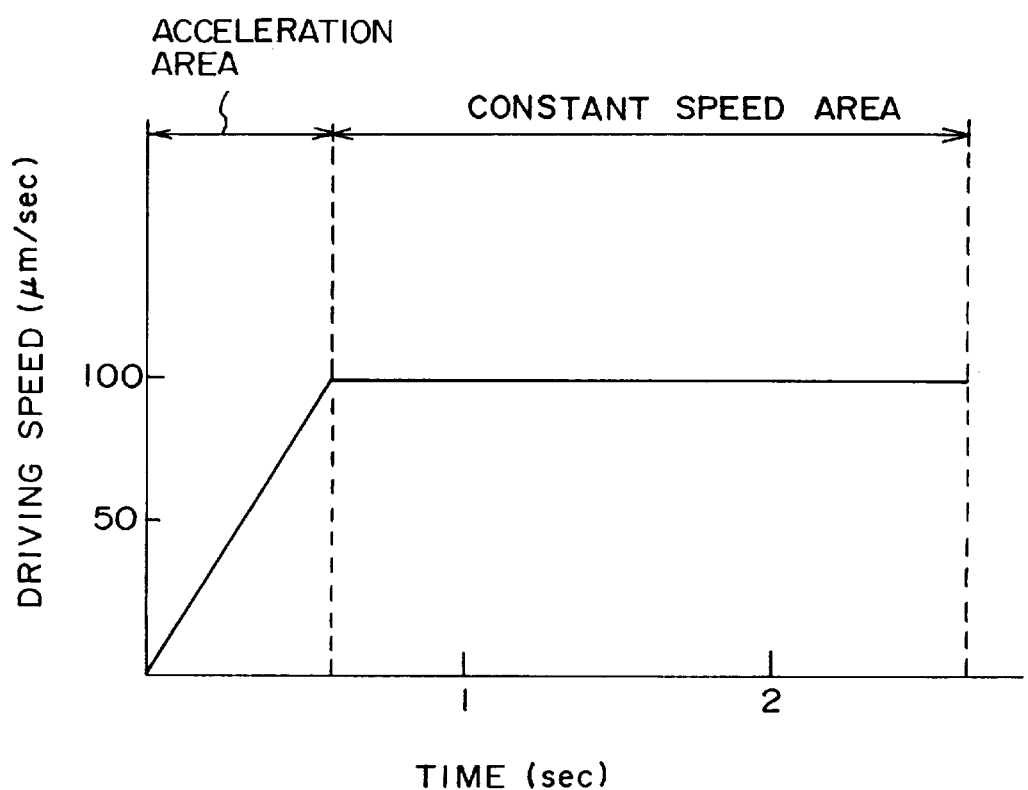

Since the pulse motor makes its trapezoidal speed changes as shown in FIG. 6B, it should be good enough if only its driving is set so that the time zone immediately after the beginning of processing, during which the changing amount of thermal expansion is small, may agree with the driving acceleration range of the pulse motor. Then, the mask is allowed to follow the rapid stretch of the work due to heat given thereto. After that, during the time zone where the changing amount of thermal expansion becomes smaller, the pulse motor is driven at its normal speed.

Now, the description will be made of the actual driving condition. Given the total pitch of a desired processing pattern as l=9 mm and the changing amount of thermal expansion on one side of the work as 2 μm, the amount of mask movement is 90 μm or more and 300 μm or less for absorbing the changes of such thermal expansion. Usually, it takes one second or more and three seconds or less to process the through hole completely when the laser processing is performed by a frequency of 200 Hz. Therefore, the driving speed of the pulse motor is approximately 30 μm/sec or more and 300 μm/sec or less.

As a result, it becomes possible to solve the problem existing in the conventional processing that the drilling positions are deviated from the grooves due to the changes of thermal expansion of a work. In this way, heads can be manufactured with good printing capability provided reliably therefor.

As described above, it is possible to minimize the variation of processing pitches for grooving or drilling per work by positively moving the mask 22 by a specific amount continuously during processing, thus executing it at uniform pitches, and also, stabilizing the processing pitches when grooving or drilling.

Further, during the exposure of excimer laser beams L to the work 10, the movement driving device 23 is intermittently driven in order to move the mask 22 intermittently in the direction of the optical axis of excimer laser beams L. It becomes possible to minimize the variation of processing pitches for grooving or drilling per work by positively moving the mask 22 by a specific amount intermittently during processing, thus executing it at uniform pitches, and also, stabilizing the processing pitches when grooving or drilling.

Further, when the excimer laser beams L are exposed to the work 10, the mask 22 is usually used fixedly without any movement, and then, it may be arranged to allow the controller 24 to calculate the amount of movement in order to eliminate any pitch deviation only when the occurrence thereof is confirmed in processing and forming grooves or holes, hence making it possible to process grooves or holes at regular pitches by automatically driving the movement driving device 23 in accordance with the amount corresponding to such pitch deviation thus confirmed.

In this way, the variation of processing pitches is eliminated per work to execute grooving and drilling at uniform pitches. At the same time, the positioning adjustment of the mask can be performed automatically unlike the conventional art where such adjustment is manually made. In this way, the time required for such adjustment is significantly shortened to enhance the production efficiency accordingly.

Further, among the recording heads for which the present invention can be utilized effectively, there is the full-line type recording head that has a length corresponding to the maximum width of a recording medium recordable by the recording apparatus. Such full line head may be structured by combining a plurality of recording heads described above or may be structured by one full line recording head integrally formed.

Since the present embodiment is structured as described above, it is possible to contribute to manufacturing liquid jet recording heads without any deviation of processing pitches for grooving and drilling due to the thermal expansion or contraction of the resin ceiling plate thereof when laser is applied to such grooving and/or drilling in the formation of liquid flow paths and/or discharge openings on the resin ceiling plate or the like. Also, the positioning adjustment of the mask can be executed automatically in good precision, making it possible to shorten the time required for the execution of such adjustment, as well as to enhance the yield of products significantly.

Further, the arrangement is made so that the position of the mask is automatically adjusted when the deviation of processing pitches takes place. It this way, the time required for maintenance with respect to the mask positioning adjustment is curtailed, thus improving the throughput accordingly. Hence, it becomes possible to contribute to reducing the manufacturing costs of liquid jet recording heads significantly.

What is claimed is:

1. A method for manufacturing a liquid jet recording head comprising the following steps of:

forming liquid flow paths on a roughly molded resin product by at least one of grooving by an irradiation of at least one laser beam and forming discharge openings by drilling by the irradiation of the at least one laser beam;

moving in a direction of an optical axis of said at least one laser beam a mask having opening patterns for at least one of grooving and drilling arranged for an optical path of said at least one laser beam during processing by the irradiation of said at least one laser beam in order to prevent processing pitches from being deviated due to heat;

providing a projection lens between the mask and the roughly molded resin product; and irradiating parallel laser beams from the projection lens onto the roughly molded resin product.

2. A method according to claim 1, wherein said mask is continuously moved in the direction of the optical axis of said at least one laser beam during the process of at least one of grooving and drilling by the irradiation of said at least one laser beam.

3. A method according to claim 1, wherein said mask is intermittently moved in the direction of the optical axis of said at least one laser beam during the process of at least one of grooving and drilling by the irradiation of said at least one laser beam.

4. A method according to claim 1, wherein said mask is moved in the direction of the optical axis of said at least one laser beam when the pitch deviation is confirmed for at least one of the liquid flow paths and holes processed to be formed during at least one of grooving and drilling by the irradiation of said at least one laser beam.

* * * * *

UNITED STATES PATENT AND TRADEMARK OFFICE
CERTIFICATE OF CORRECTION

PATENT NO.   : 6,075,222
DATED        : June 13, 2000
INVENTOR(S)  : Toshinori Hasegawa It is certified that error appears in the above-identified patent and that said Letters Patent is hereby corrected as shown below:

Column 3,
Line 33, "processed." should read -- are processed. --;
Line 36, "illustrates" should read -- illustrate --.

Column 4,
Line 37, "$\Delta 1 = 2\mu m$" should read -- $\Delta \ell = 2\mu m$ --;
Line 38, "1=9mm." should read -- $\ell$=9mm. --;
Line 40, "1" should read -- $\ell$ --;
Line 41, 1+2X$\Delta$1" should read -- $\ell$+2>$\Delta\ell$ --;
Line 61, "the" should read -- this --.

Column 5,
Line 4, "take" should read -- takes --;
Line 29, "$\Delta 1 = 2\mu m$" should read -- $\Delta\ell = 2\mu m$ --;
Line 30, "1=9mm." should read -- $\ell$=9mm. --;
Line 32, "$\Delta 1$," should read -- $\Delta\ell$, --;

Line 35, "$\frac{2X\Delta\iota}{Q}$" should read -- $\frac{2X\Delta\ell}{Q}$ --;
Line 65, "1=9mm" should read -- $\ell$=9mm --.

Signed and Sealed this

Fourth Day of December, 2001

*Attest:*

NICHOLAS P. GODICI
*Attesting Officer*  *Acting Director of the United States Patent and Trademark Office*